INVENTORS
G. F. JUDE, J. C. NEWTON,
R. S. BRANNIN, P. HALPERT.
BY
Herbert A. Thompson
ATTORNEY.

April 28, 1953  G. F. JUDE ET AL  2,636,699
AUTOMATIC PILOT FOR AIRCRAFT
Filed Sept. 14, 1946  4 Sheets-Sheet 2
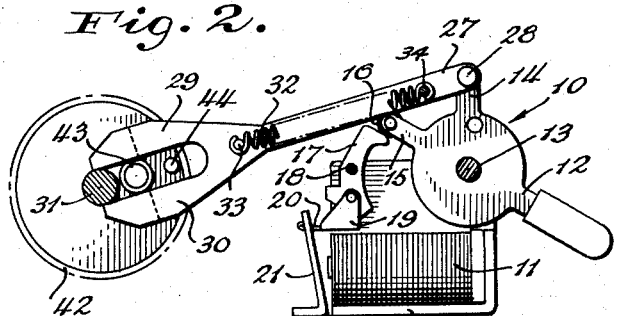
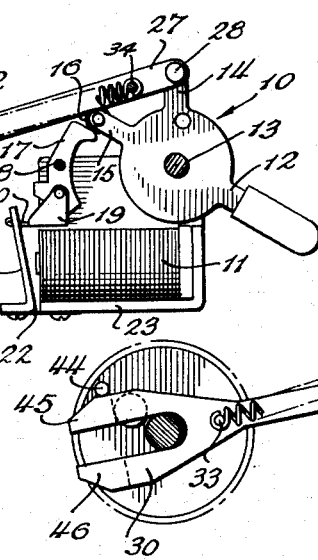
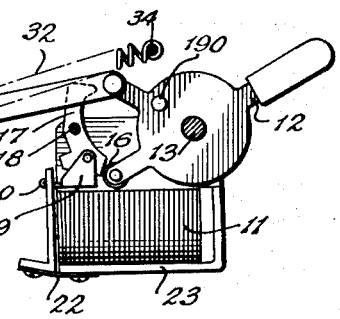
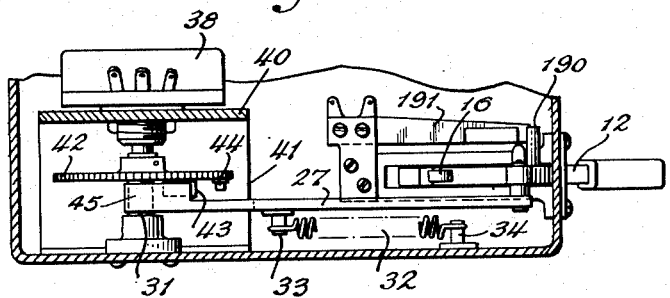
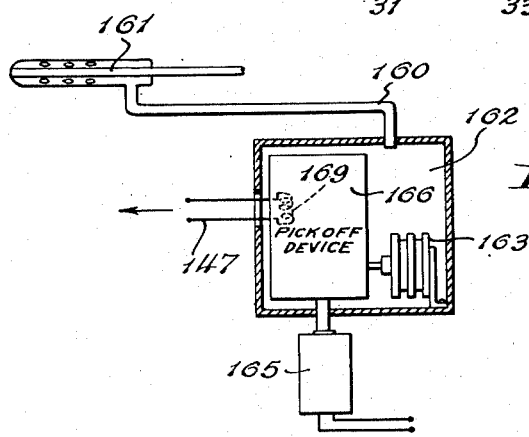
INVENTORS
G. F. JUDE, J. C. NEWTON,
R. S. BRANNIN, P. HALPERT.
BY Herbert H. Thompson
their ATTORNEY.

April 28, 1953 G. F. JUDE ET AL 2,636,699
AUTOMATIC PILOT FOR AIRCRAFT
Filed Sept. 14, 1946 4 Sheets-Sheet 3

INVENTORS
G. F. JUDE, J. C. NEWTON,
R. S. BRANNIN, P. HALPERT.
BY
Herbert P. Thompson
ATTORNEY.

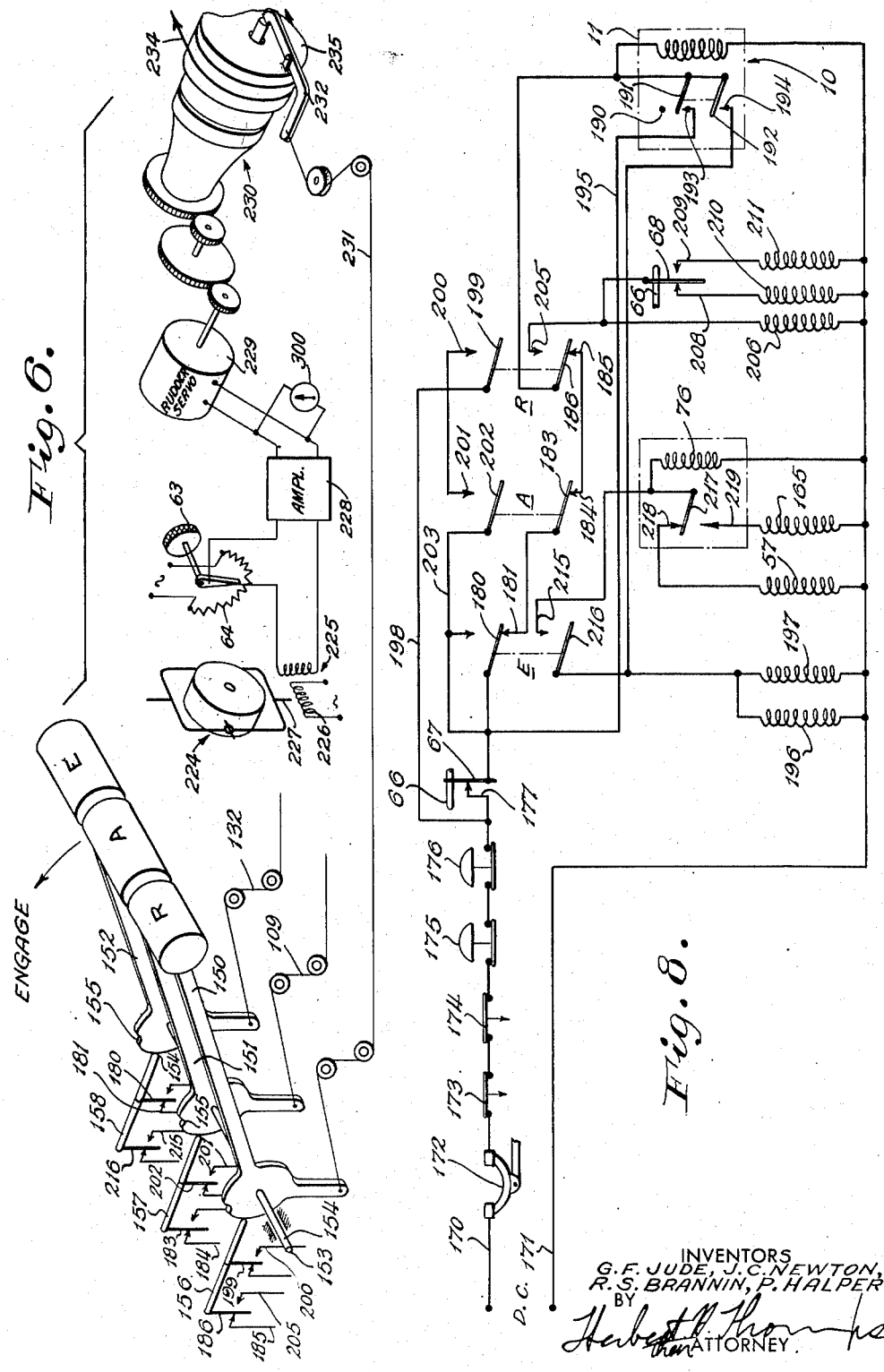

Patented Apr. 28, 1953

2,636,699

UNITED STATES PATENT OFFICE 2,636,699

AUTOMATIC PILOT FOR AIRCRAFT

George F. Jude, Richmond Hill, John C. Newton, Hempstead, Richard S. Brannin, East Williston, and Percy Halpert, Hempstead, N. Y., assignors to The Sperry Corporation, a corporation of Delaware Application September 14, 1946, Serial No. 697,080

25 Claims. (Cl. 244—77)

This invention relates to an automatic pilot for aircraft and more particularly to a simplified system which will enable the human pilot to operate an automatic pilot equipment with a minimum of effort and attention and with absolute safety. A feature of the present invention is an arrangement wherein only two operations are required to engage an automatic pilot—turning on a switch and moving an engaging handle. Turning on a second switch is all that is needed to hold a constant barometric pressure altitude. Engaging and disengaging the equipment in flight is accomplished merely by moving this same engaging handle. Electrical and mechanical releases and interlocks are provided to simplify operation, virtually preventing improper operation procedure. All the controls necessary to maneuver the airplane may be incorporated in one control unit.

The invention may be used in connection with any of a number of known automatic pilots and will be described in connection with an automatic pilot wherein a signal system for controlling the attitude of the airplane on all three axes is continuously synchronized with the attitude of the aircraft when the pilot is not engaged, but with a master switch, to be described, in "on" position. With such a system as the airplane climbs, dives, turns, or flies straight and level, the signal system constantly synchronizes itself to these changing attitudes and at the instant that the pilot is engaged no signal is applied to move the control surfaces. With this feature, the transition from manual to automatic flight is smooth and without any attitude change even though the plane is in a climb or descent when engaging the automatic pilot.

The invention will now be described with reference to the accompanying drawings, of which Fig. 1 is a perspective view of a control instrument for an automatic pilot according to the present invention;

Figs. 2 and 3 are side views of an electromechanical switch showing the switch in off and on positions respectively;

Fig. 4 is a plan view of the electromechanical switch;

Fig. 6 shows an engaging and disengaging apparatus for the servos;

Fig. 7 shows schematically an altitude control apparatus, and

Fig. 8 is a wiring diagram of the control circuits.

Figure 1:
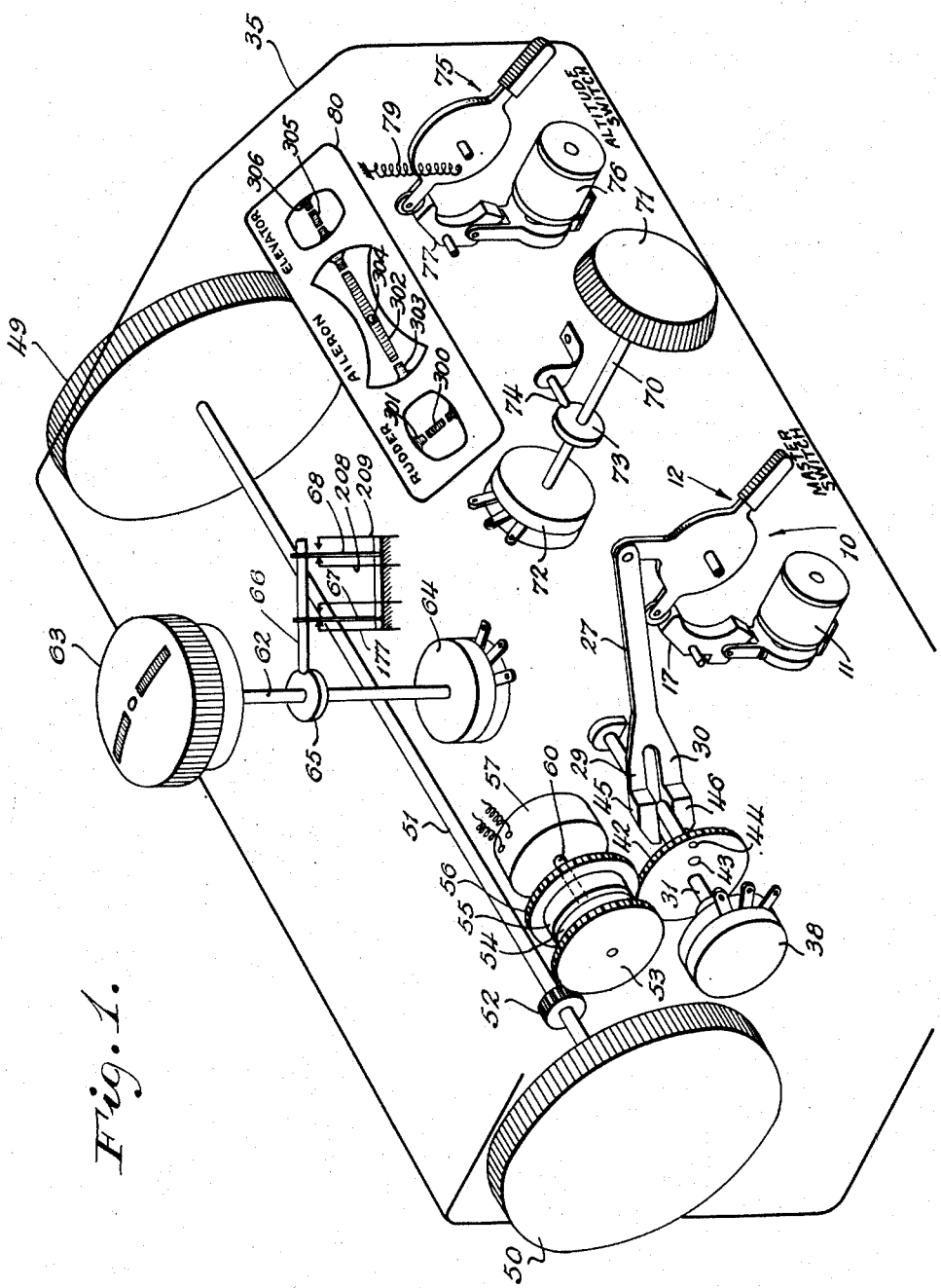

Figs. 2, 3 and 4 show a switch 10, referred to herein as a master switch provided with an electromagnet 11 arranged so that, when the winding of the electromagnet is energized, the switch may be operated manually to either the "open" or "closed" position. When the magnet is deenergized, the switch automatically returns to the open position and is locked there. The switch comprises a lever 12 supported on a pivot 13. Arms 14 and 15 are fixed in spaced relation to the lever. A roller 16 pivoted near the end of arm 15 cooperates with a dog 17 mounted on a fixed pivot 18. A link 19 pivotally connected to the dog below pivot 18 is formed with a tab 20 projecting from one end thereof. The tab extends through an opening in armature 21 of electromagnet 11 and is folded over at the end forming a slightly yielding coupling between the dog and the armature by which movement of the armature rocks the dog about pivot 18. The armature is supported by a flat spring 22 attached to a member 23 on which magnet 11 is supported.

One end of a bifurcated link 27 is attached by pivot 28 to arm 14 of the lever. Two spaced arms 29 and 30 thereof are free to ride back and forth on opposite sides of a shaft 31 when lever 10 is turned on pivot 13. One end of a spring 32 is attached to spring post 33 on link 27 and the other end of the spring is attached to a post 34 fixed to a casing 35 which encloses the instrument. Switch 10 is shown in Fig. 2 in the "off" position with magnet 11 deenergized. Spring 32 is effective to turn lever 12 to off position whenever magnet 11 is deenergized. When magnet 11 is deenergized, spring 22 which supports armature 21, straightens out moving the armature away from its polepiece, and at the same time rocks dog 17 in a clockwise direction, to bring the upper end thereof under roller 16 thereby blocking any movement of the switch lever 12. The switch, then, cannot be turned on until magnet 11 is energized.

Fig. 3 shows the switch in "on" position, magnet 11 being energized. When magnet 11 is energized armature 21 rocks dog 17 in a counterclockwise direction about pivot 18 withdrawing the upper end of the dog from under roller 16. Lever 12 may then be turned at will to either "on" or "off" position. When the lever is turned to "on" position, spring 32 is stretched, and roller 16 engages the surface of dog 17 below pivot 18 and cams the dog out of its path until it passes beyond the lower end of the dog where it is retained in "on" position against the tension of spring 32 by the lower end of the dog which, however, can be displaced by manual pressure on the switch lever when it is desired to turn the switch to "off" position while the magnet is still energized.

When switch 10 is turned off, link 27 attached thereto is moved in an endwise direction toward the right of the drawing and this movement is utilized to centralize a control device for a servo system, the control device, in a preferred embodiment of the invention being a potentiometer 38 whose control element is fixed with respect to shaft 31.

Switch 10 is mounted preferably in the front part of a casing 35, Fig. 1, which serves to support and enclose a unitary apparatus which gives the human pilot complete automatically stabilized control of his aircraft at all times. The unit, provides simple interlocking controls for turning the automatic pilot on and off and for maneuvering the airplane into climbs, descents, and turns. In addition, single controls are provided for turning an altitude control off and on and for trimming the plane laterally, if required. Three meters of known type, 300 for the rudder, 302 for the ailerons and 305 for the elevator, afford a visual indication of the condition or energization of the signal system for all three respective axes.

In Fig. 4, potentiometer 38 is shown as being supported by an upright 40 of a bracket 41 attached to the casing. A gear 42 provided with pins 43 and 44 aligned along a radius thereof is secured to potentiometer shaft 31. Fig. 4 shows the actual construction of the potentiometer apparatus, while Fig. 1 shows the parts schematically, and rearranged somewhat to show the device more clearly. However, it will be understood that the arrangement of Fig. 1 is the mechanical equivalent of that shown in Fig. 4. The surface of link 27 is spaced from the adjacent surface of gear 42 by thickened parts 45 and 46 formed on arms 29 and 30 thereof so as to permit rotation of the pin 43 underneath arms 29 and 30 when switch 10 is turned on as shown in Fig. 3. Pin 44 limits the rotary movement of shaft 31 by engaging the outer edges of either of the parts 45 or 46, to prevent pin 45 from being displaced to such extent as to become aligned with the slot separating arms 29 and 30 of the link. With the arrangement just described, when the potentiometer shaft is displaced any amount in either direction within the described limits from its neutral position shown in Fig. 2, movement of switch 10 to "off" position, will retract link 27 toward the right of the drawing, and the thickened parts either 45 or 46 of the link will engage pin 43 and displace the potentiometer shaft and also the gear to its neutral position shown in Fig. 2. Movement of the switch to "off" position may be due either to manual actuation thereof, or in the case when relay 11 is deenergized, the switch will be turned off by spring 32.

Potentiometer 38 is used for providing a signal which controls servo apparatus, to be described, for displacing a control surface of the airplane. In the present embodiment of the invention, potentiometer 38 is used to control the displacement of the airplane about its pitch axis, and is operated by knobs 49 and 50 fixed to opposite ends of a shaft 51 extending through opposite sides of the casing 35. The control unit is designed to be mounted between the pilot and co-pilot's position, and the two knobs are provided in order that the unit may be conveniently operated from either position.

A gear 52 fixed to shaft 51 drives a gear 53 attached to the driving member 54 of clutch having a driven member 55 fixed to gear 56 which meshes with gear 42. A clutch magnet 57 is coupled by shaft 60 to driven member 54 and causes the driving and driven members to engage when the magnet is energized. When the magnet is energized, knobs 49 and 50 actuate potentiometer shaft 31 through the train of mechanism just described, and when the magnet is deenergized, the knobs may be turned freely without having any effect upon the apparatus. The circuits controlling clutch magnet 57 will be described.

A shaft 62 extending through the top of casing 35 has a turn control knob 63 mounted thereon connected to a potentiometer 64 which controls the attitude of the airplane about the yaw axis. A detent collar fixed to shaft 65 has a depression formed therein which controls a follower member 66 attached to the tongues 67 and 68 of a nest of contacts. The circuits for these contacts will be described.

A shaft 70 extending through the front of casing 35 has a knob 71 fixed thereto. The shaft is connected with a potentiometer 72 which controls aileron servo circuits used for adjusting the roll attitude of the aircraft.

An altitude switch 75 mounted on the front of casing 35, in the present embodiment of the invention is identical with switch 10 except that it has no mechanism like that controlled by link 27. Switch 75 may be turned on and off at will when its magnet 76 is energized. As in the case of switch 10, when magnet 76 is deenergized, the switch if operated will be returned automatically by a spring 79 to "off" position where it remains locked by its dog 77 so long as the magnet 76 is deenergized.

An indicator panel 80 mounted in the front of casing 35 provides a convenient location for the aforesaid three meters 300, 302 and 305, which as stated, show whether the aircraft is out of agreement with, i. e., is responding to, the signal systems controlling the craft through the automatic pilot about its respective yaw, roll and pitch axes by furnishing a visual indication of the condition or response of the signal systems governing the respective rudder, elevator and aileron servomotors 229, 104 and 126.

The rudder meter is shown as a vertical mark 300 normally aligned with upper and lower indices 301 and which shifts laterally to the right or left whenever a turn signal is sent to the rudder servomotor to cause it to shift the rudder in the direction to cause a corresponding turn of the craft. The ailerons indicator is a normally horizontal mark or bar 302 normally aligned with opposite indices 303, but which tilts about central pivot 304 upon a signal being sent to the aileron servomotor to cause movement of the ailerons to roll the aircraft accordingly. The elevator indicator is shown as a normally horizontal mark 305 normally aligned with the indices 306 and which moves up and down whenever a signal is sent to the elevator servo to cause ascent or descent of the craft. There is thus provided upon the control box 35 means whereby the pilot is kept informed at all times of the operation of the three servomotors.

While Fig. 1 shows both the exterior and interior of the box in a more or less diagrammatic form, it is believed it will be clear from the figure that the actual contactors, rheostats, shafts and levers are within the box, while only the control knobs 49—50, 63 and 71, the handles of the switches 10 and 75 and the follow-back indicators 80 appear outside of the box, as is shown more clearly in the copending design application, now Design Patent No. 148,339 of Jack C. Wilson, dated January 6, 1948 for A Navigational Instrument for Aircraft, assigned to the same assignee as this application.

The various elements of the control unit 35 just described cooperate with circuits controlled by a pilot engaging control unit used to mechanically engage and disengage the automatic pilot. With the control box placed between the pilot and copilot or in front of or beside the pilot, as stated above, it will be seen that all three control handles 49—50, 63, 71 are directly at hand, as well as the master switch 10 and the altitude switch 75 and that on this same unit, useful follow-back indications 80 are provided showing the response of the servomotors to the signals transmitted.

It should also be noted that the servo control knobs are positioned so that their movements are in the plane and in the direction that the pilot desires the craft to be turned. Thus, the pitch controlling knobs 49—50 are on the two sides of the box 35 so that forward rotation of these knobs will cause downward pitch of the craft and backward rotation, climb. The azimuth control or turn knob 63, on the other hand, is on a vertical shaft 62, so as to turn in azimuth, and right or left rotation of this knob causes right and left turning of the craft in azimuth. Again, the roll or aileron knob 71 is positioned on a fore-and-aft shaft 70 so that clockwise or right rotation of the same will cause right roll of the craft and left movement a corresponding left roll. All knobs are on a single box 35 at the side or in front of the pilot. In fact, the box may be used as a convenient hand rest for the pilot and all three knobs may be operated by a very slight movement of the hand.

An automatic pilot for use with the present invention will now be briefly described. Such pilots are well known to those skilled in the art and the description will be limited to such details of an automatic pilot as are thought necessary to give an understanding of the present invention.

Figure 5:
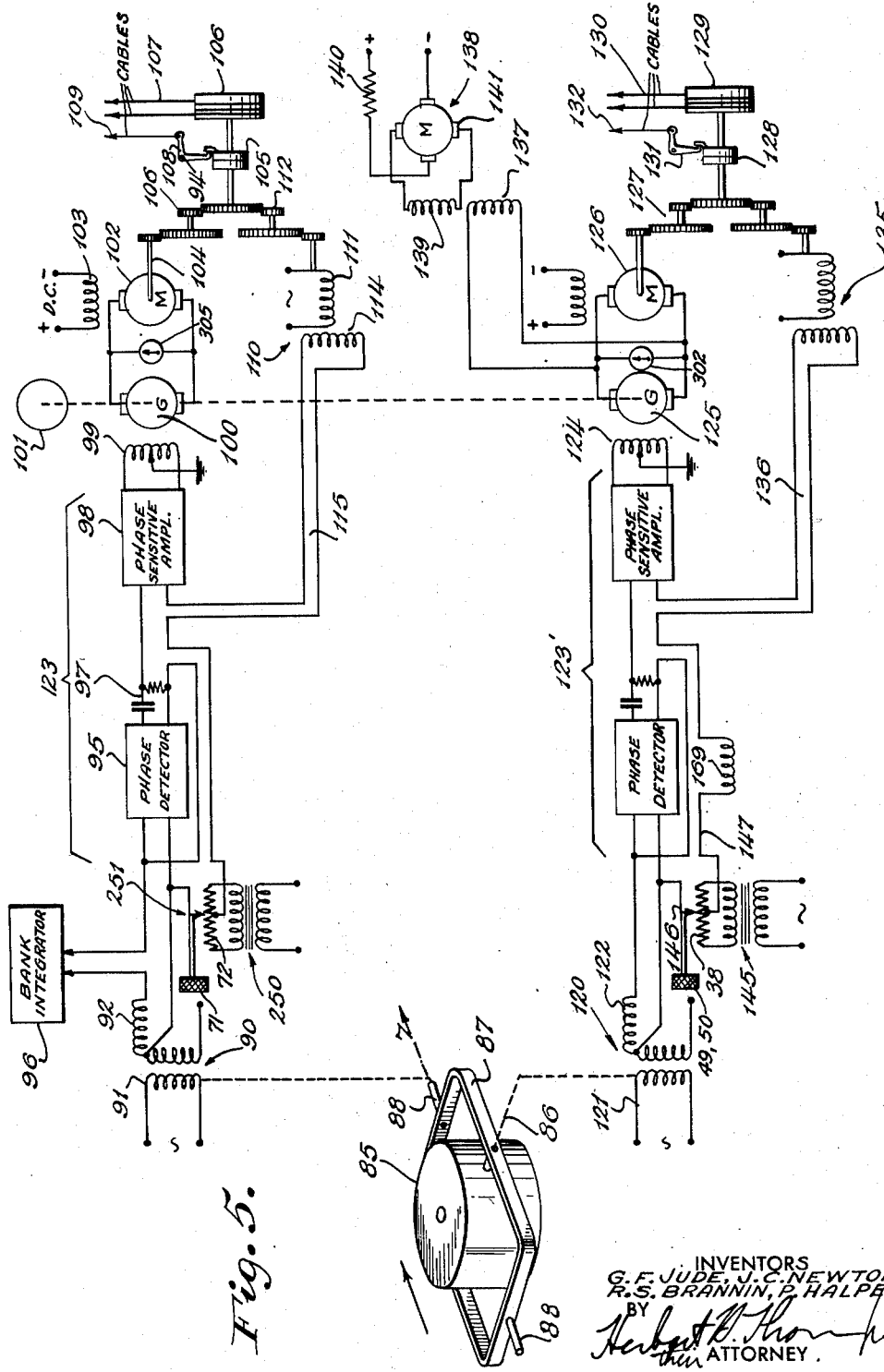
Fig. 5 is a schematic wiring diagram showing servo circuits associated with a gyro apparatus.

Fig. 5 shows a schematic diagram of amplifier and servo circuits controlled by a gyro vertical 85. This gyro furnishes a roll and pitch reference in the conventional manner for the automatic pilot. The casing of gyro 85 is pivotally supported at its pitch axis 86 by a gimbal ring 87 which in turn is supported for rotation by pivots 88 about the roll axis. The latter axis is in alignment with the longitudinal axis of the airplane as indicated by the arrow in the drawing.

Deviations of the airplane from the reference position about the roll axis are detected electromagnetically in the arrangement shown by the roll control means, shown as a selsyn or other signal generator 90 which is composed of a rotor 91 fixed to the gimbal ring 87 and a stator 92 fixed to the gyro support, not shown. The rotor 91 is excited preferably from a source of alternating current. Relative displacement of the rotor and stator due to roll of the airplane will induce a signal proportional to the displacement in the winding of the stator 92. When the airplane is flying level laterally, the position of the stator of the selsyn 90 with respect to the rotor is such that the induced voltage in the stator winding is substantially zero.

When the airplane is displaced about the roll axis, the stator is rotated with respect to the rotor. As the stator rotates away from the zero voltage position, the magnitude of the roll signal voltage increases in proportion to the displacement. A "left wing down" position of the aircraft which causes rotation of the stator in one direction will produce a voltage 180 degrees out of phase with respect to the voltage produced by a "right wing down" position. The detection of this phase difference is accomplished in an aileron flight amplifier 123, about to be described, by comparing the phase of the signal voltage to the unchanging phase of the pilot power supply, in the known manner, and thus the phase of the roll signal voltage represents the direction of displacement and the magnitude of the signal voltage the amount of displacement. In the diagram of Fig. 5 selsyn stator 92 is shown as being connected across the input of phase detector 95. For the purposes of the present description the bank integrator circuit 96 may be ignored. The output of the phase detector is fed through a rate network 97 to the input of phase sensitive amplifier 98 which has a split field winding 99 of a generator 100 connected across its output circuit. Generator 100 is one of three generators arranged in tandem with a driving motor 101 which furnish power for operating respective servomotors which actuate the control surfaces of the airplane. Two of these generators are shown in the drawings.

The output of generator 100 drives servomotor 102 at a rate and in a direction in accordance with the output voltage of the generator. The field winding 103 of the motor is energized from a source of direct current. The servomotor shaft 104 drives one member of a clutch 105 through a train of reduction gearing 106. The clutch, when engaged, drives a drum 106 provided with a wire cable 107 connected in the usual fashion to the ailerons. The clutch is provided with a clutch release arm 108 for controlling the engaging and disengaging of the clutch. The release arm is a bell-crank shaped member which is supported on a suitably located pivot 94. One end of the release arm has a wire cable 109 attached thereto which when pulled turns the release arm on its pivot and disengages the clutch. The means for actuating cable 109 will be described.

A repeat back control means also shown as a selsyn 110 has its rotor 111 driven from the shaft 104 of motor 102 through a train of gears 112. The voltage induced in the stator winding 114 of the repeat back selsyn is fed back by circuits 115 into the amplifier system. The repeat back signal voltage from selsyn 110 serves two prime purposes as follows:

a. The actual displacement of the control surface by the servo in response to a gyro or other signal impressed on the amplifier input is limited by this repeat back signal. Desirable static and dynamic characteristics of the servo system are, thus, obtained.

b. Before engaging the autopilot servos to the control surfaces, the amplifier input signals are "followed-up" by equal and opposite repeat back voltages nullifying the amplifier output, zeroing the aforesaid meters and permitting the servos to be engaged at any time without deflecting the surfaces and, thus, without changing the aircraft attitude. This is known as automatic alignment.

The aileron flight amplifier 123 is a known circuit arrangement including the elements 95, 97 and 98. The low voltage signal from the roll flight selsyn is fed as input to the aileron flight amplifier. The amplifier measures the rate of change of the incoming displacement signal, mixes this rate voltage with the displacement signal, and amplifies the resultant signal. The amplifier is phase-sensitive thereby making it direction conscious. The amplifier output functions through the generator.

Automatic alignment is attained in the following manner: When the airplane deviates in roll from the reference position, the signal voltage induced in the roll selsyn 90 is applied to the aileron flight amplifier, producing a working signal which is applied to the aileron servo generator 100 and then to the aileron servo motor 102. The servo motor, since it is disengaged from the cable drum, is free to rotate in either direction without affecting the ailerons and thereby the attitude of the airplane. The rotation of the servo motor causes the rotation of the rotor 111 of the repeat back selsyn 110. This produces a voltage which is fed back as input to the aileron flight amplifier, the voltage will be in opposite phase and of a magnitude necessary to buck the applied signal voltage from the roll selsyn 90 to zero. As soon as the net signal input to the amplifier is zero, the output from the amplifier becomes zero thereby stopping the rotation of the aileron servo motor and zero the affected meter 302. This signal alignment system is fully automatic, each and every aircraft attitude change is followed quickly and accurately.

Deviations of the airplane about the pitch axis 86 of the vertical gyro are detected by the pitch control means selsyn 120 which has a rotor winding 121 energized from a source of alternating current attached at the pitch axis of the gyro and a stator winding 122 fixed to the gyro structure. The stator winding 122 is connected to the input of an elevator flight amplifier 123' which is substantially the same in structure and operation as the amplifier arrangement controlled by the roll selsyn 93 and therefore there is no need to repeat the description. The output of amplifier 123' is connected across the split field 124 of generator 125 which is driven by motor 101. The output of the generator drives elevator servo motor 126 which is coupled by reduction gearing to clutch 128 which in turn drives an elevator drum 129 provided with cables 130 for controlling the elevators. Clutch 128 has a disengage arm 131 provided with a cable 132. When the cable is pulled the clutch disengages. A repeatback selsyn 135 is driven from the driving side of the clutch and furnishes a repeatback voltage to the amplifier over circuits 136. This servo system is automatically synchronized in the same manner as that for the ailerons.

The output of the elevator servo generator 125, in addition to being applied to the elevator servo, is also always applied to the motor field 137 of a trim tab servo 138 to provide automatic pitch trim correction.

Potentiometer 38 which has already been described in connection with the master switch, is shown in Fig. 5 as having its contact member 146 which is actuated by pitch control knobs 49 and 50, connected to the input of the elevator flight amplifier 123'. The terminals of the potentiometer resistance are connected across the secondary winding of a power transformer 145, while the midpoint of the potentiometer is connected by conductor 147 to the amplifier 123'.

Rotation of either of the two pitch knobs 49 or 50 away from the operator moves the wiper 146 across the potentiometer resistance to produce a pitch control signal voltage which is fed to the elevator flight amplifier, the elevator servo generator, and the elevator servo to deflect the elevator downward and thereby produce a change of aircraft attitude in the "nose down" direction. The greater the displacement of the pitch knob the greater the signal produced. Preferably, the potentiometer 38 is excited by a low-voltage alternating current. The stages that the signal goes through after it is applied as input to the displacement channel of the amplifier 123' are identical to those of the roll flight signal, already described. As the nose of the airplane starts to drop, the pitch flight selsyn in the vertical gyro produces a signal voltage which opposes the pitch control signal voltage, being opposite in phase. The airplane continues to change attitude until the two signals are equal and opposite, at which time the signal to the elevator servo is zero. The repeatback signal, which has been operating to limit the displacement of the elevator from its original position, now returns the elevator to that position and the airplane remains in the nose-down attitude for continued flight. Rotation of either pitch knob 49, 50 towards the operator produces a pitch control signal voltage of opposite phase, resulting in a "nose-up" condition of the aircraft. Automatic zeroing of the signal voltage and of meter 305 from the pitch potentiometer 38 is accomplished every time the master switch 10 is turned off by means of the mechanism actuated by the master switch which has already been described.

If, after engaging the automatic pilot in flight, it is found that one wing is slightly above or below the laterally level position, then the operator can correct this condition by rotating the aileron knob 71, Fig. 1, which moves the wiper of potentiometer 72 from its midpoint to produce an output signal. Under normal operating conditions the knob is centered and the output signal from the wiper is zero. Potentiometer 72 is shown in Fig. 5 connected across the secondary winding of a transformer 250, the wiper 251 thereof being connected to the input circuit of phase-sensitive amplifier 98. Displacement of the aileron knob 71 effects the operation of the aileron servo in the same manner as the signal from potentiometer 38 operates the elevator servo.

The automatic pilot, according to known practice is provided with a suitable directional gyroscope 224, preferably of the kind known commercially as the "Gyrosyn" for controlling displacement of the airplane about its yaw axis. The apparatus controlled by the directional gyro will be understood to be substantially the same as that associated with the gyro vertical, even though certain elements, such as the generator and feed back selsyn have been omitted for the sake of simplification. A selsyn 225 having a rotor 226 controlled by relative displacement of directional gyro about its vertical axis 227 controls an amplifier 228 and a rudder servo 229.

Potentiometer 64, Fig. 1, which is actuated by turn control knob 63 is connected with the input circuits of amplifier 228 and is effective to control rudder servo 229 as shown diagrammatically in Fig. 6. Servo 229 drives through disengagable clutch 230 to turn the drum 235 on which the rudder actuating cable 234 is wound. The clutch is spring actuated in the known manner and may be disengaged by pulling wire cable 231 which is attached to the clutch release arm 232.

Fig. 6 shows the pilot engaging control which comprises a plurality of levers or handles operable individually or as a unit by the pilot or co-pilot in one direction to engage mechanically all of the servo clutches, including that for the trim tab servo, not shown in this figure. Movement of the control as a unit in the opposite direction disengages the clutches. Wire cables 109, 132 and 231 connect the respective levers with the disengage arms of the associated servo clutches to control the operation of the clutches by the levers. The unit in the present embodiment comprises three levers 150, 151 and 152 pivoted on a common shaft 153. Each lever has a cam 154 and a dwell 155 formed thereon which actuate respective followers 156, 157 and 158. Each of the followers actuates movable contact members which engage one or the other of respective pairs of fixed contacts, depending on whether the associated follower is positioned on the cam or in the dwell. The contacts and the circuits controlled thereby will be described.

Fig. 7 shows diagrammatically an altitude control device, which when operatively connected will maintain the airplane in flight automatically at a desired altitude. This device is preferably of the kind disclosed in the application of Alexander W. Meston, Serial No. 652,477, filed March 6, 1946. In the drawing, the static pressure tube 160 of a Pitot tube 161 is connected to a chamber 162 within which is an evacuated bellows 163. A magnetic clutch 165 when energized operatively connects a pickoff device 166 to the bellows. An output winding 169 of the pickoff device is connected to the input circuit 147 of the elevator flight amplifier as shown in Fig. 5.

Bellows 163 is effective to actuate the pickoff device indicated in the diagram in accordance with changes in altitude when operatively connected thereto by magnetic clutch 165. On operation of the clutch, deviation of the airplane in one direction or the other from the desired altitude will cause a signal of the appropriate direction to appear across the winding 169 to actuate the servo 126 to bring the plane back to the desired altitude. The altitude control is switched on or off by switch 75, Fig. 1. The circuits associated with the altitude control will be described in more detail further on.

Fig. 8 shows an arrangement of interlocking circuits interconnecting various elements described above effective automatically to prevent operation thereof except in a predetermined sequence. The circuits comprise main conductors 170 and 171 connected to a suitable source of direct current on the airplane. Conventional circuit protective devices are serially connected with conductor 170 which include an overload circuit breaker 172, and an alternating current under voltage relay 173 having a winding included in a main source of alternating current for the airplane, not shown, provided to prevent operation of the control circuits except when the ship's alternating current supply is above a predetermined voltage limit. Manually operated circuit breakers 175 and 176 are for operation by the pilot and co-pilot respectively for the purpose of disconnecting all of the control circuits, and at the same time placing the airplane under manual control. Contacts 67 and 177 serially connected with those just mentioned, become engaged when the turn control knob 63 is in detent position.

With the clutch engage handles in their disengaged position as shown in Figs. 6 and 8, an initially operated part of the control circuit may be further traced through contacts 180 and 181 closed by the elevator engage handle 152 when in disengage position. The fixed contact member 181 is connected to movable contact member 183 actuated by the aileron release handle 151. When the latter is in disengage position, contact 183 engages fixed contact 184 which in turn is connected to the fixed contact 185 of the switch controlled by the rudder engage handle 150. When handle 150 is in disengage position, contact 185 is engaged by movable contact 186 which is connected to one terminal of electromagnet 11 associated with master switch 10. The opposite terminal of the magnet winding is connected to the return circuit 170 of the source of direct current. The circuit just traced causes the initial operation of switch magnet 11, thereby making the manual operation of master switch 10 possible.

Once the master switch is turned on, various combinations of controlling devices described above may be operated, but only in a given sequence which insures safe operation of the airplane. Departure from the prescribed order of operation will, in one way or another, break the energizing circuit for magnet 11 with the resulting automatic turning off of the master switch, making it necessary to arrange the controls in the manner described above before the switch magnet 11 is again energized, after which the pilot may be again turned on. The following description relates largely to the circuits for maintaining, or breaking the energizing circuits for magnet 11 as the various controlling devices for the automatic pilot are operated, the energizing circuits being operated one way or another with each of the control elements.

A pair of contacts 191—193, 192—194 in the master switch, when the switch is on, close circuits shunting the switches actuated by the engage control handles 150, 151, and 152 to provide a holding circuit for magnet 11, permitting the engage control handles to be operated subsequently, individually or collectively at will, while magnet 11 is still kept energized. A pin 190, Figs. 3 and 4, fixed to the side of lever 12 of the master switch operates movable contact members 191 and 192 which engage fixed contacts 193 and 194 respectively when the master switch is on. Contacts 191 and 192 are connected in parallel, both contacts being connected to a terminal of magnet 11. When the master switch is on, circuit 195 connected to circuit 170 beyond the switches controlled by the clutch engage handles, and to fixed contact 193 of the master switch provides a circuit by which magnet 11 is kept energized irrespective of the subsequent operation of any or all of the engage handles. At the same time, contacts 192 and 194 of the master switch on engaging, close a circuit from conductor 170 to one terminal of the windings of each of the relays 196 and 197 having opposite terminals of their windings connected to the return control circuit 171. The latter relays then operate, and the contacts thereof which it is not thought necessary to show close circuits which supply operating power to the various servo systems above-described.

Once the master switch has been turned on, the engage control levers 150, 151 and 152 may be moved to their engage position to engage the respective servo clutches. The automatic pilot is then effective to control the attitude of the airplane.

As already described, knob 63 controls the attitude of the airplane about the yaw axis, while the pitch control knobs 49 and 50 control the "nose up" and "nose down" attitude thereof. The invention makes provision for the operating of the respective servo clutches individually or collectively, but as a safety measure, interlocking circuits are provided by which no control knob may be effectively operated from its initial null or neutral position after the master switch is on, unless the clutch, or clutches of the servos associated therewith are engaged. Failure to engage the proper servo for a given control knob will open the energizing circuit for switch magnet 11 thereby turning the pilot off, and the respective controls must be reset to neutral positions before the master switch can be turned on again. These circuits will now be described.

The turn control knob 63 is associated with the rudder and aileron servos, and if operated when either the rudder engage handle 150, or the aileron engage handle 151 is in the disengage position, the energizing circuit for magnet 11 will be opened. Assuming both the rudder and aileron engage handles are in engage position, this holding circuit for magnet 11 which shunts contacts 67 and 177 of the turn control knob 63 includes conductor 198 connected to the main conductor 170 and to the movable contact member 199 of the rudder engage handle which is now considered to be engaging its associated stationary contact 200. The latter is connected with fixed contact 201 of the aileron engage handle now engaged by the associated movable contact 202 which is connected by conductor 203 to the main conductor 170 on the opposite side of contacts 67 and 177. Therefore, with the master switch on, and both rudder and aileron engage switches in their engage positions, the turn control knob 63 may be freely operated without interrupting the circuit for magnet 11. However, under these conditions, if either the rudder or aileron engage handles are displaced, the circuit for magnet 11 will be broken and the master switch will turn off automatically.

In addition to the circuits associated with magnet 11, the rudder engage handle when in engage position operates further circuits as follows: Contact 186 thereof engages contact 205 closing a circuit from the master switch contact 191 to one terminal of the winding of a relay 206 having its opposite terminal connected to the other side of the source of potential, thereby operating the relay. Relay 206 is provided with contacts, not shown, which when the relay is operated, connects potentiometer 64, Fig. 1, in effect across the input of the rudder amplifier, to put the rudder servo under the control of the potentiometer. It is not thought necessary to show this circuit arrangement as it will be understood by those skilled in the art from what has gone before.

The turn control knob 63 is provided with a second set of contacts including a movable contact 68 which cooperates with stationary contacts 208 and 209, the latter being engaged by contact 68 when knob 63 is out of detent position, while contacts 68 and 208 are engaged when knob 63 is in detent position. When the knob is in detent position contacts 68 and 208 close a circuit through the winding of a relay 210 connecting the same in parallel with relay 206. Relay 210 is provided with contacts, not shown, which short circuit a turn controller, not shown, to provide dynamic braking therefor, immediately on the positioning of control knob 63 in its detent position.

When turn control knob 63 is moved out of detent, contacts 68 and 209 close a circuit connecting a relay 211 in parallel with relay 206, at the same time breaking the circuit which energizes relay 210. Relay 211 is provided with contacts, not shown, which disconnect erection and levelling circuits from the gyros. This is a known practice for eliminating the effects on the gyros of accelerations imparted to levelling and erection members during turns, as shown in the patent to Hanson and Esval, 2,270,875, dated January 27, 1942, for Gyro Vertical and Automatic Pilot for Aircraft.

Pitch potentiometer 38, Figs. 1 and 5, can be actuated by pitch control knobs 49 and 50 only when the magnetic clutch 57 associated therewith is energized. It will be recalled that this potentiometer is mechanically positioned in neutral by the master switch when off. This potentiometer controls the elevator servo and can be actuated only when the operating circuit for the magnetic clutch 57 is closed by the elevator engage handle on being moved to its engage position when contacts 215 and 216 associated with the elevator engage handle 152 are engaged, closing an energizing circuit for the clutch 57. This circuit may be traced from circuit 195, contact 194 of the master switch, contacts 215 and 216, contacts 217 and 218 of the altitude control switch 75 in "off" position, winding 57 of the clutch to the opposite main control circuit 171. When the clutch 57 is thus energized, the pitch knobs 49 and 50 are operatively connected by the clutch to the pitch potentiometer 38. On the closing of contacts 215 and 216 of the elevator engage handle, the magnet 76 of the altitude control switch initially connected in parallel with clutch 57, is energized making it possible to operate the switch at will. This switch is generally the same as the master switch 10 and turns off automatically and locks when the magnet 76 thereof is deenergized. On operation of the altitude control switch, contact 217 breaks with contact 218 and makes with contact 219 thus deenergizing the clutch 57, since the pitch control knobs should be ineffective when it is desired to maintain a given altitude. The circuit already traced from contact 215 now extends through contacts 217 and 219 through the windings of the altitude control clutch 165, Fig. 7, making the altitude control device effective to control the elevator servo. Should the elevator engage handle 152 be moved to disengage position while the altitude control switch is on, the circuit for the altitude switch magnet 76 will be broken thereby and the altitude switch will snap off.

The automatic pilot of the present invention can be engaged with complete safety when the airplane is in normal level flight or in any normal descent or climb including just after take-off. If the automatic pilot is turned on in a climb or dive, the airplane will continue to fly in that attitude until the human pilot originates a signal to change the attitude.

The aileron trim knob 71 is provided for trimming, if the automatic pilot is engaged and the airplane is not level about the roll axis. By turning the knob to the right or left, as needed, it creates a signal resulting in the ailerons being actuated so as to bring the wings to level flight position. When the human pilot wishes to maintain specific pressure altitude, he merely turns on the altitude control switch. This renders the pitch knobs 49 and 50 inoperative and it will not be possible to put the airplane into a climb or a dive. If the altitude control switch is turned on in a climb or descent, the airplane will level off and hold altitude. When the altitude control switch is turned off, the aircraft will return to the pitch attitude at which the altitude control switch was turned on.

The control unit 35 reduces the task of maneuvering to the manipulation of two knobs, a pitch knob 49 or 50 for climbing or descending and a turn knob 63 for right and left turns, the effect being shown by the two adjacent meters 305 and 300, respectively.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an automatic pilot for aircraft, a plurality of power-driven clutches for controlling attitude, a control member movable from an initial null position for controlling the power for one of the clutches, a self-locking master switch for the automatic pilot and an initially operable circuit responsive to the disengaging of the clutches and controlled by the control member when the latter is in its null position for releasing the switch.

2. In an automatic pilot for aircraft, a plurality of power-driven clutches for controlling attitude, a turn control member movable from an initial neutral position for controlling the power for one of the clutches, a self-locking master switch for the automatic pilot and an initially operable circuit responsive to the disengaging of the clutches and controlled by the turn control member when the latter is in neutral position for releasing the switch.

3. In an automatic pilot for aircraft, a plurality of power-driven clutches for controlling attitude, a movable control member for controlling the power for one of the clutches, a lever for each clutch movable to engage or disengage the same, contact means for each lever, a self-locking master switch for the automatic pilot, and a circuit including the contact means of the respective levers when operated on the movement thereof to disengage the clutches, the circuit being further controlled by the control member when in a predetermined position for initially releasing the switch to permit operation thereof.

4. In an automatic pilot for aircraft, a plurality of power-driven clutches for controlling attitude, a control member movable from an initial null position for controlling the power for one of the clutches, a self-locking master switch for the automatic pilot, an initially operable circuit responsive to the disengaging of the clutches and controlled by the control member on displacement thereof to null position for releasing the master switch, and further circuits responsive to the subsequent operation of the master switch for maintaining the master switch unlocked to permit engaging the clutches.

5. In an automatic pilot for aircraft, a plurality of power-driven clutches for controlling attitude, a movable control member for controlling the power for one of the clutches on displacement of said member from an initial null position, a self-locking master control member for the automatic pilot, an initially operable circuit responsive to the disengaging of the clutches and controlled by the control member on displacement thereof to null position for releasing the master control member, further circuits responsive to the subsequent operation of the master control member for maintaining the master control member unlocked to permit engaging the clutches, and means for insuring safe operation of the aircraft which comprises means for interrupting the last-mentioned circuit controlled by the control member when displaced from said null position prior to the engagement of the clutch associated therewith.

6. In an automatic pilot for aircraft, a plurality of power-driven clutches for controlling attitude including a rudder operating clutch movable in either direction from an initial null position, a turn control member contact means associated therewith operable by the turn control member on displacement into or out of null position, a self-locking master control member for the automatic pilot, an initially operable circuit responsive to the disengaging of said clutches and including said contact means effective when the turn control member is displaced to null position for releasing the master control member, holding circuits also including said contact means responsive to subsequent operation of the master control member for maintaining the latter unlocked on subsequent engagement of the clutches, safety means for insuring the operation of the control in proper sequence comprising further circuit means for interrupting the holding circuits and thereby locking the master control member effective on the operation of the turn control member prior to the engagement of the associated clutch.

7. In an automatic pilot for aircraft, a plurality of power-driven attitude control clutches including an elevator clutch, an operating device for engaging and disengaging the latter clutch, a pitch control device for controlling the power of the elevator clutch, a self-locking altitude control switch, circuit means controlled by the operating device on engaging of the elevator clutch for releasing the altitude control switch and operatively connecting the pitch control device to control the power of the elevator clutch, and circuit means controlled by the altitude switch on subsequent operation thereof for disabling the pitch control device.

8. In an automatic pilot for aircraft, a plurality of power-driven attitude control clutches including an elevator clutch, an operating lever for engaging and disengaging the latter clutch, a pitch control knob, a magnetic clutch for operatively coupling the knob to control the power of the elevator clutch, an altitude control switch including an electromagnet, spring means for turning off the latter switch on de-energization of the electromagnet, circuit means including contacts controlled by the operating lever on engagement of the elevator clutch for energizing the magnetic clutch and the electromagnet in parallel, and further circuit means controlled by the altitude control switch on operation thereof for breaking the energizing circuit for the magnetic clutch.

9. In an airplane having control surfaces, an automatic pilot comprising a plurality of servos, each associated with a control surface for the purpose of displacing the same, control circuits for the servos, a plurality of movable members, one for each servo interconnected in the control circuits for regulating the displacement of the respective control surfaces, a master switch movable to "on" and "off" positions for effecting corresponding operation of the control circuits, automatically operable means for retaining the master switch against movement when in "off" position, and circuit means controlled by at least one of the movable members when disposed in neutral position for disabling the switch retaining means.

10. In an airplane having control surfaces, an automatic pilot comprising a plurality of servos, each associated with a control surface of the airplane for the purpose of displacing the same, a plurality of circuits for controlling the servos, a plurality of movable control members one for each servo interconnected in said circuits for controlling the displacement of the control surfaces, a clutch for each servo, respective disconnecting devices therefor for detachably connecting the servos to the associated control surfaces, a master switch movable to "on" and "off" positions for effecting corresponding operation of the control circuits, means automatically operable for retaining the master switch against movement on displacement thereof to "off" position, and circuit means initially controlled by the operation of the clutch disconnecting devices and by at least one of the movable members to predetermined positions for disabling the retaining means.

11. In an aircraft having control surfaces, an automatic pilot comprising a plurality of servos, each associated with a control surface of the aircraft for the purpose of displacing the same, a plurality of circuits for controlling the servos, a plurality of movable control members one for each servo interconnected in said circuits for controlling the displacement of the control surfaces, a clutch for each servo each provided with a disconnecting device for detachably connecting the respective servos to the associated control surface, a master switch movable to "on" and "off" positions for effecting corresponding operation of the control circuits, means for locking the master switch in "off" position, circuit means effective to disable the locking means including a plurality of sets of contacts, one set for each disconnecting device jointly controlled by an initial operation thereof and including further contact means operable by at least one of the control members when in neutral position.

12. In an aircraft having control surfaces, an automatic pilot comprising a plurality of means, one for each of the control surfaces for displacing the same, a plurality of movable members, one for each means, for controlling the operation thereof, control circuits for the means, a master switch for the control circuits displaceable to "on" and "off" positions, means comprising an electromagnet effective when de-energized for locking the master switch in one of said positions, and circuit means incuding the winding of the electromagnet responsive to the displacement of the movable members to predetermined positions for energizing initially the electromagnet and disabling thereby the locking means.

13. In an aircraft having control surfaces, an automatic pilot comprising a plurality of means, one for each of the control surfaces for displacing the same, a plurality of movable members, one for each means for controlling the operation thereof, control circuits for the means, a master switch for the control circuits displaceable to "on" and "off" positions, means comprising an electromagnet effective when deenergized for locking the master switch in the "off" position, circuit means including the winding of the electromagnet actuated on the displacing of at least one of the movable members to a predetermined position for energizing the electromagnet and thereby disabling the locking means, and spring means attached to the switch effective to move the same to "off" position on deenergization of the electromagnet.

14. In an aircraft having control surfaces, an automatic pilot comprising a plurality of means, one for each of the control surfaces of the aircraft for displacing the same, a plurality of movable members, one for each means for controlling the operation thereof, control circuits for the means, a master switch for the control circuits displaceable to "on" and "off" positions, means comprising an electromagnet effective when deenergized for locking the master switch in the "off" position, circuit means including the winding of the electromagnet controlled on the displacement of at least one of the movable members to a predetermined position for energizing the electromagnet and thereby disabling the locking means, and further circuits controlled by an initial operation of the master switch to "on" position for maintaining the electromagnet in energized condition irrespective of the movement of the movable members.

15. In an aircraft having control surfaces, an automatic pilot comprising a plurality of servo means, one for each of the control surfaces of the aircraft for displacing the same, a plurality of movable members, one for each servo means for controlling the operation thereof, control circuits for the servo means, a master switch for the control circuits displaceable to "on" and "off" positions, means comprising an electromagnet effective when deenergized for locking the master switch in the "off" position, circuit means including the winding of the electromagnet effective on the positioning of the movable members in predetermined positions for energizing the electromagnet and thereby disabling the locking means, further circuits controlled by an initial operation of the master switch to "on" position for maintaining the electromagnet in energized condition irrespective of the movement of the movable members, and spring means effective on deenergization of the electromagnet for moving the switch to "off" position.

16. In an aircraft having control surfaces, an automatic pilot comprising a plurality of servo means, one for each of the control surfaces of the aircraft for displacing the same, a plurality of movable members, one for each servo means for controlling the operation thereof, control circuits for the servo means, a master switch for the control circuits displaceable to "on" and "off" positions to effect corresponding operation of the servo means, means comprising an electromagnet effective when deenergized for locking the master switch in the "off" position, circuit means including the winding of the electromagnet actuated on the displacement of at least one of the movable members to a predetermined neutral position for energizing the electromagnet and thereby disabling the locking means, spring means effective on deenergization of the electromagnet for moving the switch to "off" position, and means actuated by the switch on displacement to its "off" position for moving at least one of the movable members to its neutral position.

17. In an aircraft having control surfaces, an automatic pilot comprising a plurality of servo means, one for each of the control surfaces of the aircraft for displacing the same, a plurality of movable members, one for each servo means for controlling the operation thereof, control circuits for the servo means, a master switch common to the control circuits displaceable to "on" and "off" positions to effect corresponding operation of the servo means, means comprising an electromagnet effective when deenergized for locking the master switch in the "off" position, circuit means including the winding of the electromagnet controlled by at least one of the movable members when disposed in a predetermined neutral position for energizing the electromagnet and thereby disabling the locking means, spring means connected to the switch effective on deenergization of the electromagnet for moving the switch to "off" position, and mechanical linkage means connecting the switch to at least one of the movable members effective to move the latter to its neutral position on the actuation of the switch to "off" posiion.

18. In an aircraft having control surfaces, an automatic pilot comprising a plurality of servos, each associated with a control surface of the aircraft for the purpose of displacing the same, a plurality of circuits for controlling the servos, a plurality of movable control members, one for each servo interconnected in said circuits for regulating the displacement of the control surfaces, a clutch for each servo, each provided with a disconnecting device for detachably connecting the same to the associated control surface, a master switch for the control circuits movable to "on" and "off" positions, means comprising an electromagnet effective when deenergized for locking the master switch in the "off" position, circuit means including the winding of the electromagnet jointly controlled by the respective disconnecting device when operated to disconnect the associated clutches and by at least one of the movable members when in a predetermined neutral position for energizing the electromagnet and thereby disabling the locking means, and further circuits controlled by an initial operation of the master switch to "on" position for maintaining the electromagnet in energized condition during subsequent operations of the disconnecting devices.

19. In an aircraft having control surfaces, an automatic pilot comprising a plurality of servos, each associated with a control surface of the aircraft for the purpose of displacing the same, a plurality of circuits for controlling the servos, a plurality of movable control members, one for each servo interconnected in said circuits for regulating the displacement of the control surfaces, a clutch for each servo provided with a disconnecting device for detachably connecting the same to the associated control surface, a master switch movable to "on" and "off" positions for effecting corresponding operation of the control circuits, means comprising an electromagnet effective when deenergized for locking the master switch in the "off" position, circuit means including the winding of the electromagnet jointly controlled by the disconnecting devices when operated to disconnect the clutches, and by at least one of the movable members when disposed in a predetermined neutral position for energizing the electromagnet and thereby disabling the locking means, further circuits controlled by an initial operation of the master switch to "on" position for maintaining the electromagnet in energized condition during subsequent operation of the disconnecting devices and spring means effective on deenergization of the electromagnet for moving the switch to "off" position.

20. In an airplane having control surfaces, an automatic pilot including a plurality of servos each associated with a control surface of the airplane for displacing the same, a primary circuit for energizing the servos, a plurality of movable control members one for each servo energized by said circuit for controlling the displacement of the control surfaces, a clutch for each servo for detachably connecting the servos to the associated control surfaces, respective connecting and disconnecting devices for each clutch, a master switch movable to "on" and "off" positions for effecting energization and disabling of said primary circuit, means normally operable for preventing said master switch from movement away from the "off" position and circuit means brought into action by the operation of the clutch connecting devices for disabling said preventing means.

21. An automatic pilot according to claim 20 provided with means driven by the driving members of the respective clutches for generating feed back voltages for the servo control circuits for automatically aligning the driving members of the clutches with the respective controlling members whether or not the clutches are energized whereby no sudden movement of the control surfaces will result upon reconnecting the clutches after disconnection.

22. An automatic pilot according to claim 20 in which the respective clutches comprise driving and driven members, and in which individual voltage generating devices are driven by the respective servos for providing feed back voltages for the servo control circuits for the purpose of maintaining the driving members of the clutches in agreement with the control members even while the clutches are disengaged.

23. An automatic pilot according to claim 20 in which the respective clutches are provided with individual repeat back selsyns, the rotor members thereof being driven by the servo motor in fixed relation to the driving member of the clutch, certain windings of the selsyns being connected with the servo control circuits providing feed back voltages thereto for the purpose of maintaining the driving members of the clutches in agreement with the control members even while the clutches are disengaged.

24. An automatic pilot according to claim 20 in which the servo control circuits include amplifiers individual to the respective servos, and in which individual repeat back selsyns driven directly by the respective servos have their output circuits connected respectively to input circuits of the associated amplifiers for providing feed back voltages thereto effective to maintain the driving members of the clutches in alignment even when the clutches are disconnected.

25. An automatic pilot according to claim 20 in which the servo control circuits include amplifiers individual to the respective servos, and in which individual repeat-back selsyns driven directly by the respective servos have their output circuits connected respectively to input circuits of the associated amplifiers for providing feedback voltages thereto effective to limit the servomotor movement proportionally to displacement of the control member.

GEORGE F. JUDE,
     JOHN C. NEWTON,
     RICHARD S. BRANNIN,
     PERCY HALPERT.

References Cited in the file of this patent

UNITED STATES PATENTS

| Number | Name | Date |
|---|---|---|
| 1,418,335 | Sperry | June 6, 1922 |
| 1,545,373 | Vickers | July 7, 1925 |
| 1,904,801 | Plutino | Apr. 18, 1933 |
| 2,356,597 | Kronenberger | Aug. 22, 1944 |
| 2,416,097 | Hansen et al. | Feb. 18, 1947 |
| 2,466,702 | Hamby | Apr. 12, 1949 |
| 2,471,637 | MacCollum | May 31, 1949 |
| 2,474,618 | Divoll | June 28, 1949 |
| 2,516,641 | Murphy | July 25, 1950 |
| 2,516,796 | Noxon et al. | July 25, 1950 |

OTHER REFERENCES

"Aviation" of August 1943, pages 135, 136.
"Electronics," October 1944, pages 110–117.